Jan. 31, 1967    S. G. MEAD    3,301,619
UTILITY BOX

Filed Jan. 14, 1965    2 Sheets-Sheet 1

INVENTOR
STERLING G. MEAD

BY *Paris, Haskell & Levine*

ATTORNEYS

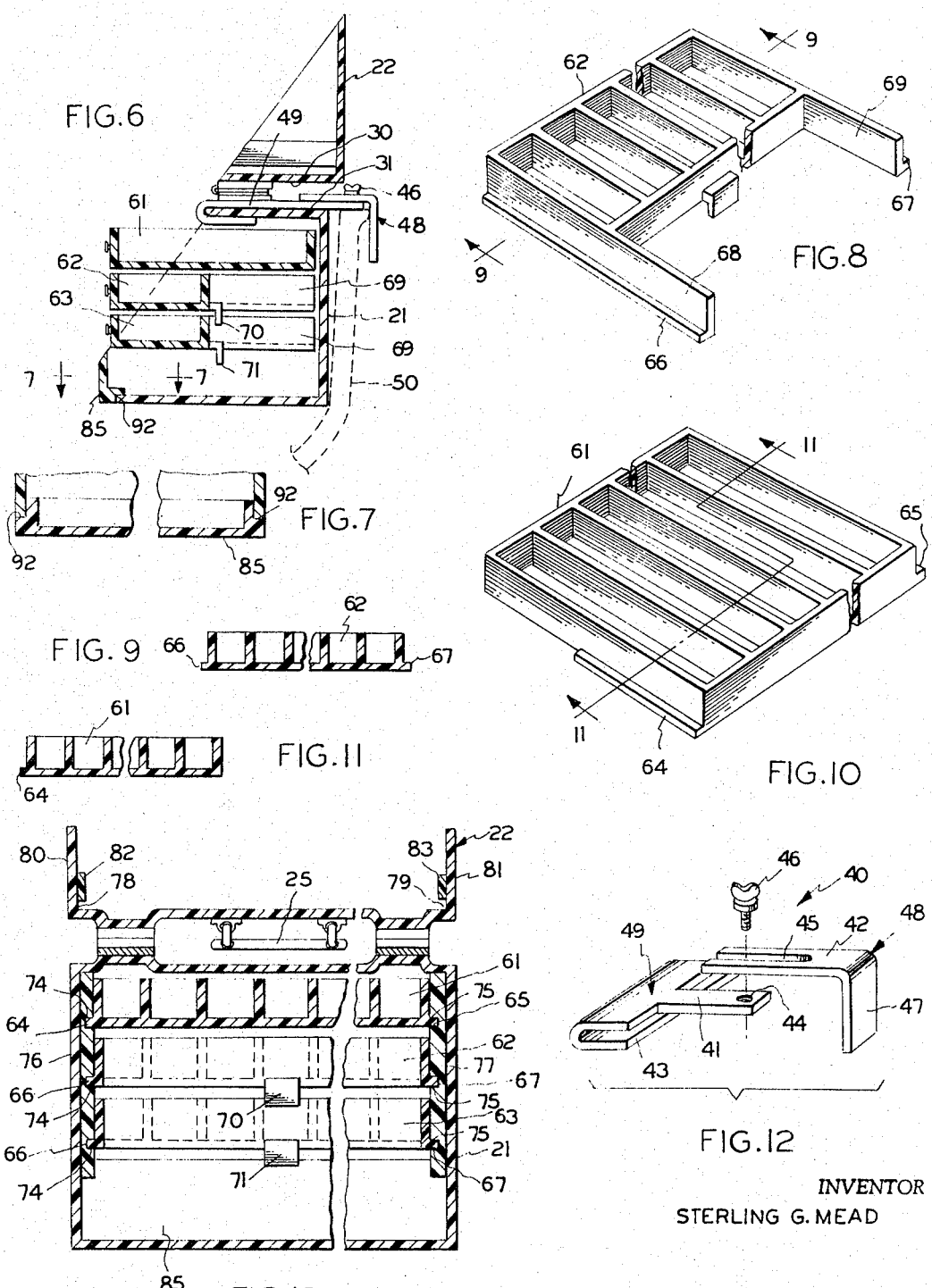

United States Patent Office 3,301,619
Patented Jan. 31, 1967

3,301,619
UTILITY BOX
Sterling G. Mead, 5101 38th St. NW.,
Washington, D.C. 20016
Filed Jan. 14, 1965, Ser. No. 425,545
13 Claims. (Cl. 312—200)

The present invention relates to boxes, and particularly to utility boxes, such as fishing tackle boxes, tool boxes, sewing baskets, etc. For the purpose of illustrating the present invention, it is described herein primarily in terms of a molded plastic fishing tackle box, although it will be readily apparent that the features of the present invention are equally applicable to boxes designed for utility purposes other than fishing tackle, and to boxes fabricated from materials other than plastic.

Utility boxes are conventionally formed with a rectangular shell, comprised of a base section having a bottom panel and four vertical side panels of equal height, upon which a cover is mounted and hinged at the juncture along one side panel. Usually the cover has a four sided vertically depending skirt which abuts or mates with the edges of the four side panels of the base section. The cover section usually opens by swinging about its hinge 180°, thereby projecting at about right angles from the side panel of the base section to which it is hinged. This arrangement leaves the box rather unstable and easily tipped due to the lever moment of the projecting cover section, unless the base section is loaded with heavy contents. Often times the open box appears stable until the user begins to remove the contents, and then it tips—particularly if the open cover section is utilized as a shelf or bar upon which to rest items taken from the box.

The conventional utility box is also usually provided with a carrying handle attached to the center of the cover section. Although these boxes are provided with a latch means to hold the cover and base sections together against opening when the box is lifted by the handle, occasionally the user neglects to secure the latch, or the latch fails to catch, and when the box is lifted by the handle, the bottom section then swings about the hinge, dumping its contents on the ground.

In accordance with the present invention, all of the foregoing disadvantages of conventional utility boxes are overcome. The shell of the present box is formed from a base section and a hinged cover section, constructed so that the cover section largely overlies the base section when swung open, thereby not overbalancing the box and rendering it unstable, and at the same time providing a work shelf or bar on the open cover upon which heavy objects can be placed without causing the box to capsize. This box is also provided with a carrying handle mounted on the hinged cover section. However, the construction obtains an appropriate balance of lever moments so that the box remains shut and upright, or substantially so, when lifted by the handle, even when the cover section has not been latched to the bottom section.

Coupled with the above-described shell construction, the present invention utilizes the features thereof to provide an interior arrangement of trays or drawers which affords ready access to all parts of the interior of the box, and which permits a number of trays or drawers to be open and their interiors to be accessible selectively or all simultaneously. At the same time, the arrangement of trays directs the utilization of the storage space to minimize the possibility of unbalancing the above-mentioned lever moments by improvident loading of the box.

Additionally, the present box shell construction enables the ready attachment of a removable clamp or bracket, whereby the open box may be hung upon a support, such as the gunwale of a boat when the box is utilized for fishing tackle.

It is accordingly one object of the present invention to provide a utility box comprising a base section and a hinged cover section, wherein the box maintains a stable balance whether closed or open.

Another object of the present invention is to provide such a utility box wherein the cover remains substantially closed and the base section substantially upright when the box is lifted by its handle, whether the cover is latched or not.

Another object of the present invention is to provide such a utility box with a number of trays or drawers, adapted to the configuration of the box and enabling maximum utility and convenience in using the box.

Still another object of the present invention is to provide a bracket adapted to the configuration of such a utility box so as to enable the box to be conveniently suspended or hung while open.

Other objects and advantages of the present invention will become apparent to those skilled in the art from a consideration of the following detailed description of one illustrative specific embodiment of the invention, had in conjunction with the accompanying drawings, wherein like numerals refer to like or corresponding parts, and wherein:

FIG. 6 is a vertical cross-sectional view of the utility box;

FIG. 7 is a sectional view of a portion of the box taken along the line 7—7 of FIG. 6;

FIG. 8 is a perspective view of one tray utilized in the box;

FIG. 9 is a sectional view of said tray, taken along the line 9—9 of FIG. 8;

FIG. 10 is a perspective view of another tray utilized in the box;

FIG. 11 is a sectional view of said other tray, taken along line 11—11 of FIG. 10;

FIG. 12 is a perspective and exploded view of a bracket utilized to suspend the box when open; and FIG. 13 is a vertical sectional view of the box as shown in FIG. 3, taken along line 13—13 thereof.

Figure 1:
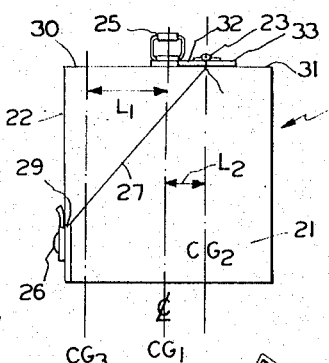
FIG. 1 is an end view of a utility box in accordance with the present invention.

The utility box illustrated in the drawings is generally indicated by the numeral 20, and comprises a base portion 21 and a cover portion 22. The two portions are joined together by hinges 23 and 24, and a handle 25 is mounted on the cover portion. A clasp 26 is provided to lock the cover portion to the base portion.

Figure 3:
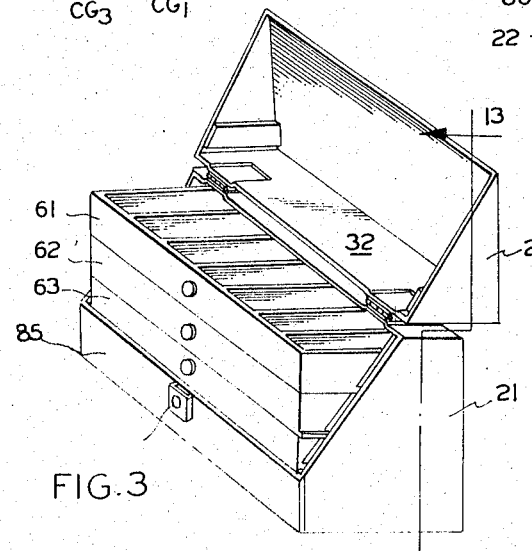
FIG. 3 is a perspective view of said utility box when open, revealing the box outfitted as a fishing tackle box.

Considering the end view of the box as shown in FIG. 1, the handle 25 is mounted on the top of the box along the vertical center line, also labeled $CG_1$ as the line passing through the center of gravity of the box as a whole. Location of the handle along the vertical center line of the box is of course dictated by the need for the box to hang straight and not twist in the hand of the user when lifted by the handle. Division of the box 20 into its two sections 21 and 22 is along a line 27 that starts at the top of the box at a point 28 on the hinge line located between the center line $CG_1$ and one vertical side of the box, and runs at an acute angle across the center line $CG_1$ to a point 29 located on the opposite vertical side of the box. The hinge line at 28 divides the top panel of the box into two portions 30 and 31. Thus the box may be opened by swinging the cover section 22 about hinges 23 and 24 until the portion 30 of the top wall forming a part of the cover section overlies the portion 31 of the top wall forming a part of the base section, as shown in FIG. 3, exposing a work shelf or bar 32 fenced on three sides.

The position of points 28 and 29, forming the termini of line 27, are intimately related for the purpose of the present invention. It is preferred that they be selected to divide the box so that: the lever moment defined by the product of the distance $L_1$ (the distance from the center line of the box $CG_1$ to the vertical line passing through the center of gravity of the cover section alone, indicated as along the center of gravity line $CG_3$) and the mass $M_1$ of the cover section 22 equals or nearly equals the lever moment defined by the product of the distance $L_2$ (the distance from the center line of the box $CG_1$ to the vertical line passing through the center of gravity of the base section alone, indicated as along the center of gravity line $CG_2$) and the mass $M_2$ of the base section 21. In other words: $L_1M_1 \approx L_2M_2$. Obviously, $CG_3$ and $CG_2$ must be on opposite sides of the overall center of gravity along line $CG_1$. It is preferred that the center of gravity of the base section be located approximately on line $CG_2$ when the box 20 is empty as well as when it is carrying the equipment it is designed to store. The design of the interior fittings of the box are intended to effect this objective, as will be explained subsequently.

Figure 2:
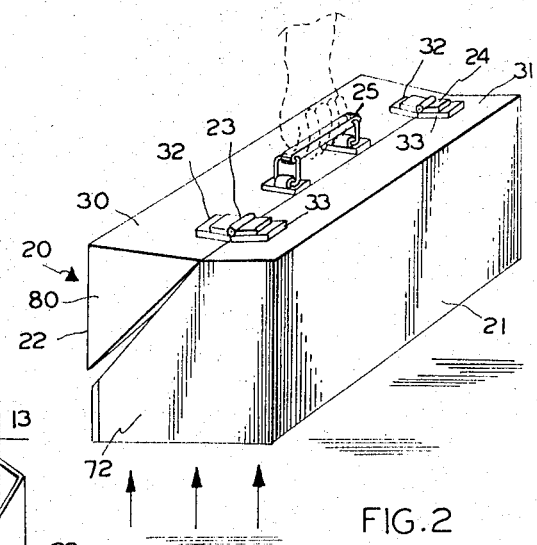
FIG. 2 is a perspective view thereof.

Although the box is provided with a latch 26 of conventional design for locking the cover section shut, in a box designed with the foregoing balance of moments such latch is not essential; and even if the box 20 is lifted by the handle 25 when the cover section 22 is not latched, as shown in FIG. 2, the box as hereinabove described will not spill its contents, as would occur with utility boxes of the usual and conventional designs, and the cover section 22 will not open except perhaps a very small amount.

The reason the box will not spill its contents is the fact that the hinge 23 is located on the center of gravity line $CG_2$ for the base section 21. Under these conditions, when the box is lifted the base section hangs from the hinge as a pendulum, and does not swing from its vertical alignment. However, if the hinge line is displaced somewhat from the line $CG_2$, the base section 21 will swing when the box is lifted until its center of gravity aligns on the vertical with the hinge. So long as this deviation of the hinge from line $CG_2$ is not great, the swing of the box section 21 is not great and is tolerable, and the contents of the box will not be spilled. If this deviation becomes too great, then of course this feature and advantage of the present invention is lost.

It should be noted that this feature of stability of the base section 21 of the box about the hinges 23 and 24 is independent of the cover section lever moment $L_1M_1$. Even if that moment is much less than the base section moment $L_2M_2$, when the unlatched box is lifted by its handle 25, the cover section will merely lift up and swing about the hinges, but the base section will be lifted vertically without swinging motion. It is of course preferred that the box be designed with the two moments $L_1M_1$ and $L_2M_2$ approximately equal, and under this condition the cover section will remain closed when the box is lifted even though it be unlatched, or perhaps will open only slightly as shown in FIG. 2. When designed with a balance of lever moments $L_1M_1 \approx L_2M_2$, if desired the latch 26 can be eliminated altogether, or to compensate for slight changes in load distribution or increases in load in the base section, a very inexpensive latch could be employed because of the small loads likely to be sustained by the latch 26. For example one could use a resilient latch of the type frequently and conventionally molded integrally with plastic box shells.

As stated earlier, when the box 20 is open, the top portion 30 of the cover section 22 overlies the top portion 31 of the base section 21. The handle 25 is therefore located between these two top portions. In order to provide space for the handle, the top portions 30 and 31 are formed with raised hinge platforms 32 and 33 for each hinge. Each of the hinges 23 and 24 is mounted to span its respective pair of raised platforms 32 and 33. Thus, when the box is opened so that the cover portion 22 rests on top of the top of the base portion 21, it does so on the raised platforms, leaving a space between the juxtaposed top surface 30 and 31. As best shown in FIG. 13, this space is adequate to receive the handle 25.

A further feature of the present invention resulting from the particular shell construction is its ability to be hung by means of a removable angle bracket. For example, as a fishing tackle box, it could be hung on the gunwale of a boat; and as a tool box, it could be hung on the back of a chair or on a window sill. One form of hanger is illustrated in FIG. 12, and is shown applied to the box in FIG. 6. The hanger 40 comprises a right angle bracket 48 and a removable clip 49. Clip 49 is formed with a main supporting arm 41 having a reverse bend 43 at one end and a threaded aperture 44 at its other end. When the box is open as shown in FIG. 6, the arm 41 is passed between the juxtaposed top wall sections 30 and 31, causing the bend 43 to pass under the top wall section 31, embracing the wall in the bite of the clip. Angle bracket 48 is formed with the two legs 42 and 47, leg 42 having an open ended slot 45; and the bracket is joined to the clip 49 by laying the slot 45 over the aperture 44, and passing the threaded stem of the wing nut 46 through the slot and threading it into the aperture 44 to clamp the bracket 48 to the clip 49. As suggested in FIG. 6, the box can then be hung on the side of a boat 50 by placing the bracket over the gunwale. To accommodate the assembly to various gunwale thicknesses, the span of the bracket can be adjusted by loosening wing nut 46, sliding the bracket along its slot 45, and then clamping it in adjusted position by tightening the wing nut 46.

The box shell as shown in the accompanying drawings is designed to house three independent drawer-like trays, and in the case of a fishing tackle box these would each be compartmented in a conventional pattern. The top tray is designated by numeral 61, the middle tray by numeral 62, and the bottom tray by numeral 63. In the preferred arrangement, the top tray 61 extends the full depth of the box, while the other two trays 62 and 63 are identical to each other and extend only for half the depth of the box.

Each of the trays is provided with runners to guide them in their sliding movement into and out of the box shell. The runners 64 and 65 of tray 61 extend only from the middle of the tray rearwardly to the back wall of the tray. This is necessary so the cover section 22 of the box can close without hitting the runners, as would happen if the runners extended the full depth of the box, in view of the interior construction of the cover as will be subsequently described.

Tray 62 has runners 66 and 67. These runners extend for the full depth of the box 20 even though the tray 62 extends for only half the depth. To support the runners 66 and 67 in their extension beyond the back wall of the tray 62, the side walls of the tray are extended to provide runner rails 68 and 69. Tray 63 is identical to tray 62, and therefore need not be further described.

A depending tab 70 is provided on the back wall of tray 62, which depends below the bottom of the tray, and tray 63 is similarly provided with a depending tab 71, whose purpose will be subsequently described.

On the interior of the base section 21 of the box, along each side wall 72 and 73, there is provided a series of channels, 74 on one side and 75 on the other side, adapted to receive and guide the runners of the trays 61, 62, and 63. A convenient way of providing these opposed channels is to utilize separate plates or moldings 76 and 77, and to apply these moldings to the end walls 72 and 73 of the box, as by cementing or the like. Opposed tray runner channels 78 and 79 are also provided on the end walls 80 and 81 of the top section 22 by similarly applying separate moldings 82 and 83 thereto.

With the trays 61, 62, and 63 supported in their runner trackways 74 and 75 and slid into the position shown in FIG. 3, the box can be closed by swinging the cover section 22 about its hinges 23 and 24. Since the runners 64 and 65 on tray 61 do not extend to the front of the tray, moldings 82 and 83 will clear the sides of tray 61, so there is no obstruction to closing the cover.

As shown in the vertical sectional view of FIG. 6, in view of the half-depth trays 62 and 63, the largest open storage volume in the box is in back of these trays. This arrangement is selected to induce the user to place the bulkier and heavier object being stored in the box in the area in back of trays 62 and 63. Thus there will be a minimum tendency for equipment stored in the box to move the center of gravity of the base section forward of the hinges 23 and 24, or forward of the line $CG_2$, and the spill-proof feature of the box is preserved even when loaded with heavy items that might tend to dominate the center of gravity of box or its base section.

Figure 4:
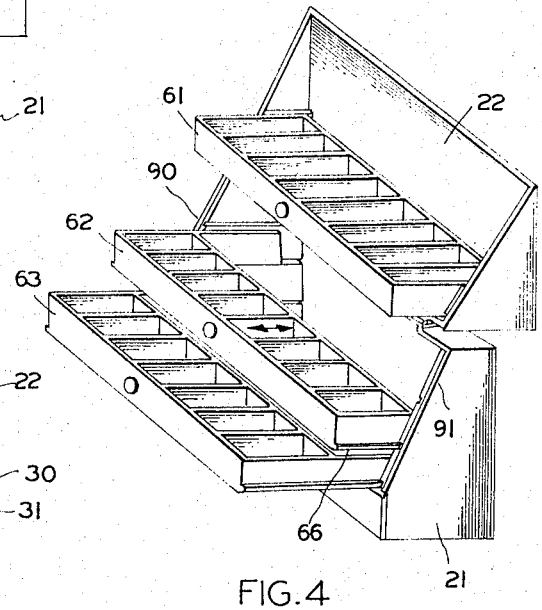
FIG. 4 is a view similar to FIG. 3, except the trays are withdrawn for complete accessibility.
Figure 5:
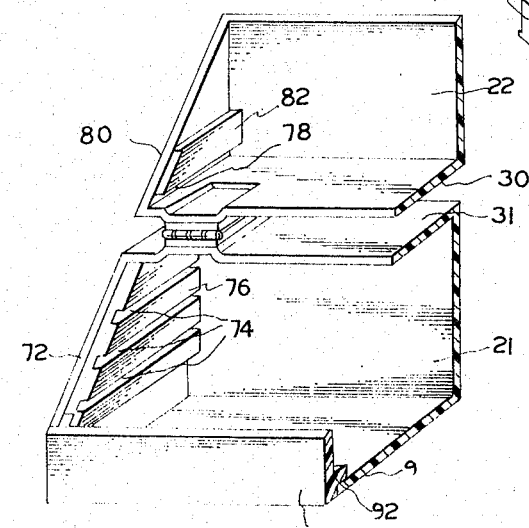
FIG. 5 is an enlarged detailed view of an end portion of the box, showing internal details thereof.

A further feature of the present box structure and tray arrangement is that the entire storage facilities of the box may be layed open at once without upsetting the stability and balance of the box. Thus after opening the cover or lid 22 into the position shown in FIG. 3, the top tray 61 is withdrawn and seated on the shelf 32 by sliding its runners 64 and 65 into the channels 78 and 79. The bottom drawer 63 is then slid outwardly until the depending tab 71 abuts the front wall 85 of the base section 21. Because of the rail extensions 67 and 68 formed on this tray, the runners remain seated in their grooves or channels 74 and 75, though the tray is fully withdrawn from the box. The box and trays are now in the condition shown in FIG. 4, and all the trays are fully accessible. To obtain access to the interior portions of the box, one need merely withdraw tray 62 until its stop tab 70 abuts against the back wall of tray 63. Again, the extension rails 68 and 69 for the runners 66 and 67 on tray 62 keep the runners seated in their trackways 74 and 75 even though the tray 62 is fully withdrawn from the box. Thus tray 62 is readily slid between the position shown in FIG. 4 and a position overlying the withdrawn tray 63.

Either of the trays 62 and 63 can be removed from the box by sliding it to its fully withdrawn position, and then lifting the tray slightly until its stop member 70 or 71 clears its abutment, whereupon the tray can be withdrawn until its runners are clear of their trackway channels.

A further feature of the present construction is that the runners of removed trays can be easily located in their trackways. Because of the sloped edges 90 and 91 of the opening to the base section, the front end of the top wall of each trackway channel 74, 75, 78 and 79 is stepped rearwardly from the front end of its respective bottom wall. Therefore, if the rear ends of the runners of a removed tray are slid downwardly along the sloping edges 90 and 91, when the trackways are reached the runners drop in because of the stepped relation between the trackway top and bottom walls, and the tray can then be easily slid into the box along the trackway channels.

It is contemplated that the preferred mode of fabricating the present utility box and its trays is by plastic molding. In order to facilitate molding of the box base section 21, the front wall 85 is molded separately, and its edges are formed with the stepped section 92 so that it will both abut and overlap the mating edge of the remainder of the base section. These two preformed portions of the base section can be united by cementing them together, or heat welding, depending on the type of plastic employed.

It was pointed out earlier that the trackway grooves for the trays are preferably provided by applying separate moldings 76, 77, 82 and 83 to the side panels of the box sections. A principal reason for this expedient is to enable the use of one box shell for a plurality of interior designs and for a plurality of utility uses. For different interior designs, other trackway panels can be employed, as required by the intended use or desired design.

As is readily apparent, the specific arrangement of interior trays, although preferred, is only one suggested embodiment. The same is true of the tray designs, and their runner and trackway arrangements. Also, variations in the design of the box shell will be apparent to those skilled in the art, still however retaining the principles and concepts of the present invention. For example, the separate moldings forming the front wall 85 of the box base section and the applied channel moldings 76 and 77 could be formed as a single molding, if desired. In another modification, the hanger 40 can be altered so that the slot 45 in angle bracket 48 is closed, and the wing nut 46 can be permanently captured in hole 44, providing an integrated hanger unit. In such instance, the hanger would be applied by passing the reverse bend of the clip 49 through the space between the open lid and base sections from the back toward the front of the box. Accordingly, it is understood that the described and illustrated specific embodiment of the present invention is presented only as exemplary of the invention, and such changes as are within the spirit and scope of the appended claims are contemplated as being within the purview of the present invention.

What is claimed is:

1. A box comprising a top panel, a bottom panel, two side panels, and two end panels, the box being divided into a base section and a lid section, said top panel, two end panels, and one side panel each having two parts, one part being incorporated in the lid section and the other part being incorporated in the base section, means hinging said two parts of said top panel for relative swinging movement of said lid and base sections about a hinge line, a handle mounted exclusively on the lid section, a tray, runner means on said tray, guide means on the inside of said parts of said end panels incorporated in said base section cooperating with said runner means for guiding movement of said tray into and out of said box, and additional guide means on the inside of said parts of said end panels incorporated in said lid section cooperating with said runner means for guiding movement of said tray on said lid section.

2. A box comprising a top panel, a bottom panel, and two side panels, the box being divided into a base section and a lid section, said top panel having two parts, one part being incorporated in the lid section and the other part being incorporated in the base section, means hinging said two parts of said top panel for relative swinging movement of said lid and base sections about a hinge line, the center of gravity of said base section and the hinge line lying on a line substantially perpendicular to the bottom panel, the division between said lid and base sections extending from the hinge line to a line along one side panel between said top and bottom panels, and a handle mounted on the part of said top panel incorporated with said lid section.

3. A box as set forth in claim 2, wherein the lever moment of the center of gravity of said base section is not substantially greater than the lever moment of the center of gravity of said lid section, said lever moments being relative to said handle as the fulcrum between said two moments.

4. A box as set forth in claim 3, wherein the distance between said handle and said hinge line is many times less than the distance between said handle and said side panel incorporated in the lid section.

5. A box as set forth in claim 2, wherein said hinge line is located closer to the other of said side panels than said one side panel.

6. A box comprising a top panel, a bottom panel, and two side panels, the box being divided into a base section and a lid section, said top panel having two parts, one part being incorporated in the lid section and the other part being incorporated in the base section, means hinging said two parts of said top panel for relative swinging movement of said lid and base sections about a hinge line, the division between said lid and base sections extending from the hinge line to a line along one side panel between said top and bottom panels, and a handle mounted on the part of said top panel incorporated with said lip section, the distance between said handle and said hinge line being many times less than the distance between said handle and said side panel incorporated in the lid section.

7. A box comprising a top panel, a bottom panel, two side panels, and two end panels, the box being divided into a base section and a lid section, said top panel, two end panels, and one side panel each having two parts, one part being incorporated in the lid section and the other part being incorporated in the base section, means hinging said two parts of said top panel for relative swinging movement of said lid and base sections about a hinge line, a handle mounted on the lid section, a tray, runner means on said tray, guide means on the inside of said parts of said end panels incorporated in said base section cooperating with said runner means for guiding movement of said tray into and out of said box, and guide means on the inside of said parts of said end panels incorporated in said lid section cooperating with said runner means for guiding movement of said tray on said lid section.

8. A box as set forth in claim 7, wherein said guide means are formed by separate means secured to said end panels.

9. A box as set forth in claim 7, including a second tray slidably supported for movement into and out of said box, the depth of said second tray being approximately one half the depth of the box.

10. A box comprising a top panel, a bottom panel, and a side panel, the box being divided into a base section and a lid section, said top panel having two parts, one part being incorporated in the lid section and the other part being incorporated in the base section, means hinging said two parts of said top panel along a hinge line, the division between said lid and base sections extending from said hinge line to a line along said side panel between said top and bottom panels, whereby said lid section is swingable about said hinge means to an open position with said two parts of said top panel being juxtaposed in face to face relationship, and removable and adjustable bracket means secured to said base section for hanging said box, said bracket means comprising means for securing said bracket means to the part of the top panel incorporated with said base section including a reversely bent clip plate adapted to clip over the edge of said base section top panel part adjacent said hinge line.

11. A box as set forth in claim 10, and further including means for adjustably uniting said bracket securing means.

12. A box comprising a top panel, a bottom panel, and two side panels, the box being divided into a base section and a lid section, said top panel having two parts, one part being incorporated in the lid section and the other part being incorporated in the base section, means hinging said two parts of said top panel for relative swinging movement of said lid and base sections about a hinge line, the division between said lid and base sections extending from the hinge line to a line along one side panel between said top and bottom panels, and a handle mounted on the part of said top panel incorporated with said lid section, the lever moment of the center of gravity of said base section being not substantially greater than the lever moment of the center of gravity of said lid section, said lever moments being relative to said handle as the fulcrum between said two moments.

13. A box comprising a top panel, a bottom panel, and two side panels, the box being divided into a base section and a lid section, said top panel having two parts, one part being incorporated in the lid section and the other part being incorporated in the base section, means hinging said two parts of said top panel for relative swinging movement of said lid and base sections about a hinge line, the division between said lid and base sections extending from the hinge line to a line along one side panel between said top and bottom panels, and a handle mounted exclusively on the part of said top panel incorporated with said lid section, the distance between said handle and said hinge line being many times less than the distance between said handle and said side panel incorporated in the lid section.

References Cited by the Examiner
UNITED STATES PATENTS

| | | | |
|---|---|---|---|
| 864,083 | 7/1907 | Cranston | 312—293 X |
| 1,352,101 | 9/1920 | Swales | 312—183 |
| 2,261,605 | 11/1941 | Smith | 312—200 X |
| 2,557,218 | 6/1951 | Ewell | 312—276 |
| 2,679,121 | 5/1954 | Hoofer | 248—28 |
| 2,745,709 | 6/1956 | Vasshaug | 312—330 |
| 2,779,649 | 1/1957 | Neilson | 312—245 |
| 3,050,356 | 7/1962 | Messmer | 312—201 |

CLAUDE A. LE ROY, *Primary Examiner.*

CHANCELLOR E. HARRIS, *Examiner.*